United States Patent
Koehler et al.

(10) Patent No.: US 12,505,449 B2
(45) Date of Patent: Dec. 23, 2025

(54) ELECTRONIC PAYMENT INTERCEPTION FRAUD DETECTION AND MITIGATION SYSTEM

(71) Applicant: Sontiq, Inc., Nottingham, MD (US)

(72) Inventors: Brandon L Koehler, Sparks, MD (US); Robyn S. Nolker, Fallston, MD (US); Renarda B. Washington, Baltimore, MD (US); Tara E. Bolt, Bel Air, MD (US); John P. Burcham, Ellicott City, MD (US)

(73) Assignee: SONTIQ, INC., Nottingham, MD (US)

( * ) Notice: Subject to any disclaimer, the term of this patent is extended or adjusted under 35 U.S.C. 154(b) by 0 days.

(21) Appl. No.: 18/479,621

(22) Filed: Oct. 2, 2023

(65) Prior Publication Data

US 2025/0111374 A1   Apr. 3, 2025

Related U.S. Application Data

(63) Continuation of application No. 17/019,823, filed on Sep. 14, 2020, now abandoned.

(51) Int. Cl.
*G06Q 20/40* (2012.01)
*G06Q 20/38* (2012.01)

(52) U.S. Cl.
CPC ..... *G06Q 20/4016* (2013.01); *G06Q 20/3821* (2013.01); *G06Q 20/389* (2013.01); *G06Q 20/4014* (2013.01); *G06Q 20/4015* (2020.05); *G06Q 2220/00* (2013.01)

(58) Field of Classification Search
None
See application file for complete search history.

(56) References Cited

U.S. PATENT DOCUMENTS

| | | | | |
|---|---|---|---|---|
| 8,355,987 | B2* | 1/2013 | Hirson | G06Q 20/102 |
| | | | | 705/40 |
| 8,645,241 | B2* | 2/2014 | Rodriguez | G06Q 20/108 |
| | | | | 705/38 |
| 9,159,058 | B2* | 10/2015 | Fleishman | G06Q 20/223 |
| 11,004,072 | B2* | 5/2021 | Georgiadis | H04L 63/08 |
| 2007/0244811 | A1* | 10/2007 | Tumminaro | G06Q 20/223 |
| | | | | 705/39 |
| 2009/0018934 | A1* | 1/2009 | Peng | G06Q 30/02 |
| | | | | 705/30 |
| 2015/0154520 | A1* | 6/2015 | Federgreen | G06Q 30/018 |
| | | | | 705/7.11 |
| 2021/0056602 | A1* | 2/2021 | Loumis | G06Q 30/0611 |

FOREIGN PATENT DOCUMENTS

CA      2832204 A1 * 11/2012   ........... G06Q 20/223

* cited by examiner

*Primary Examiner* — Christopher Bridges
(74) *Attorney, Agent, or Firm* — Sterne, Kessler, Goldstein & Fox P.L.L.C.

(57) ABSTRACT

Fraud detection within a special purpose hardware platform to detect payment interception of a first authentication file and initiate payment mitigation. A payee associated with a payee terminal device is verified as the intended recipient of the first authentication file, and the first authentication file is determined to have been intercepted in its intended delivery to the payee terminal device. A second authentication file is generated and delivered to the payee terminal device.

20 Claims, 4 Drawing Sheets

ELECTRONIC PAYMENT INTERCEPTION FRAUD DETECTION AND MITIGATION SYSTEM

BACKGROUND

Negotiable instruments such as checks, money orders, banknotes etc., have been widely used to make payments and purchases. For instance, a payor may tender a negotiable instrument to a payee to satisfy the payor's obligation to the payee. For example, an employer may provide salary paychecks to an employee (e.g., payee) in satisfaction of obligations owed for the employee's work. In order to obtain the payment amount, the payee may need to deposit the check in an account at the payee's bank, and have the bank process the check. In some cases, the payee may take the paper check to a branch of the payee's bank, and cash the check at the bank counter. Once the check is approved and all appropriate accounts involved have been credited, the check may be stamped with a cancellation mark by a bank clerk, such as a "paid" stamp. The payor's bank and payee's bank may then keep a record of the deposit information associated with the deposited negotiable instrument.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure and are therefore not to be considered as limiting of its scope. The principles are described and explained with additional specificity and detail using the following drawings.

DETAILED DESCRIPTION

The following briefly describes the subject innovations in order to provide a basic understanding of some aspects of the techniques. This brief description is not intended as an extensive overview. It is not intended to identify key or critical elements, or to delineate or otherwise narrow the scope. Its purpose is merely to present some concepts in a simplified form as a prelude to the more detailed description that is presented later.

The embodiments address a computer-centric and Internet-centric problem of an electronic payment system management to determine vulnerabilities of a terminal device, detect authentication file interception, generate and deliver a second authentication file to the terminal device. The disclosed methods and system may be implemented as computer programs or application software on one or more computing devices that process user features collected by the electronic payment system. The electronic payment system can be configured as a Software as a Service (SaaS) system, a Platform as a Service (PaaS) system, an Infrastructures as a Service (IaaS) system, or other similar on-demand software systems such as subscription-based models, etc.

Moreover, the embodiments described herein improve the technical functioning of computer file delivery systems. For example, some embodiments reduce the likelihood of data file interception due to the electronic payment system's operability to perform a series of validation and assessments of the one or more terminal device. Some embodiments may also improve data delivery system functionality by improving data delivery speed and accuracy due to the same.

Embodiments described herein are configured to perform payment transactions and detect payment fraud within a special purpose hardware platform to detect payment interception and initiate payment mitigation. As discussed further below, an electronic payment platform may facilitate payment (transfer of an authentication file associated with a specified currency amount) between a first terminal device associated with a payor (hereinafter referred to as a "payor terminal device") and a second terminal device associated with a payee (hereinafter referred to as a "payee terminal device"). The electronic payment platform may authenticate the payee terminal device by confirming and registering an electronic payment address associated with the payee terminal device.

The electronic payment platform may determine if the payee terminal device failed to receive the authentication file associated with a specified currency amount. Upon such determination, the electronic payment platform performs a series of validation and assessments of the payor terminal device and the payee terminal device. For example, the electronic payment platform reviews the initial transfer of an authentication file associated with a specified currency amount and any associated metadata to verify the payee terminal device is the intended recipient of the authentication file. The electronic payment platform receives traverse data associated with the transfer of the authentication file. The electronic payment platform determine vulnerabilities of the payee terminal device and detect authentication file interception. The electronic payment platform generates and delivers a second authentication file associated with a specified currency amount to the payee terminal device upon detection of the authentication file interception.

The authentication file may be associated with a negotiable instrument, which is a contract that obligates one party to pay a specified currency amount to a second party. In some examples of the present disclosure, a negotiable instrument is an unconditioned writing that promises or orders payment of a fixed currency amount. For example, negotiable instruments may be money orders, cashier's checks, drafts, bills of exchange, promissory notes, and/or the like. Alternatively, the authentication file can include a culmination of data blocks called a blockchain, that are linked using cryptography. Each block contains a cryptographic hash of the previous block, a timestamp, and transaction data (generally represented as a Merkle tree).

It is noted that while embodiments herein are described with reference to SaaS, PaaS, or IaaS users, where the users are different from the service providers, other intermediate entities may also benefit from the principles disclosed herein. For example, the embodiments disclosed herein may be applied to banking industries, cable television industries, retailers, wholesalers, or virtually any other industry in which authentication files associated with a specified currency amount are transferred between terminal devices and an entity within that industry.

Figure 1:
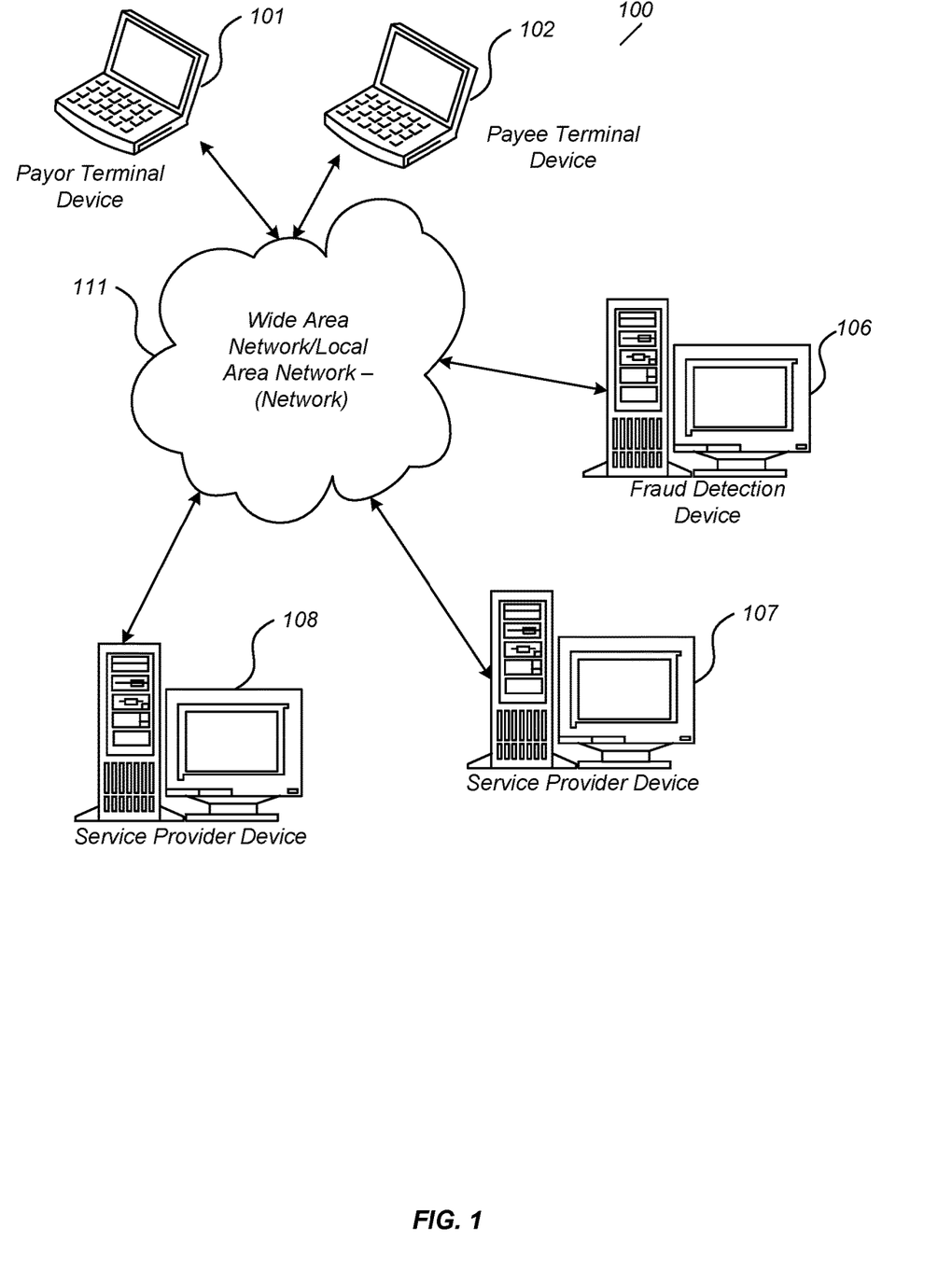
FIG. 1 illustrates an example electronic payment system in which certain examples of the disclosed principles may be implemented.

FIG. 1 illustrates an example electronic payment system 100 in which certain examples of the disclosed principles may be implemented. The example electronic payment system 100 includes a network 111, a first terminal device associated with a payor (referred to herein as "a payor terminal device 101"), a second terminal device associated with a payee (referred to herein as "a payee terminal device 102"), a fraud detection device 106, and service provider devices 107-108.

The network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one LAN to another. Furthermore, remote computers and other related electronic devices could be remotely connected to either LANs or WANs via a modem and temporary telephone link. Network 111 includes any communication method by which information may travel between computing devices.

The terminal devices 101 and 102 may include virtually any computing device that typically connects using a wired communications medium such as telephones, televisions, video recorders, cable boxes, gaming consoles, personal computers, multiprocessor systems, microprocessor-based or programmable consumer electronics, network PCs, or the like. The client device 101 may further be configured to include a client application that enables the payor or payee to log into a user account that may be managed by the service provider.

The fraud detection device 106 may include virtually any network computing device that is specially configured to determine if the payee terminal device failed to receive the authentication file and the status of the payor terminal device 101 and the payee terminal device 102. Devices that may operate as the fraud detection device 106 include, but are not limited to, personal computers, desktop computers, multiprocessor systems, microprocessor-based or programmable consumer electronics, network PCs, servers, network appliances, and the like.

Although fraud detection device 106 is illustrated as a distinct network device, the disclosed principles are not so limited. For example, a plurality of network devices may be configured to perform the operational aspects of the fraud detection device 106. For example, the initial determination that the payee terminal device failed to receive the authentication file might be performed by one or more set of network devices, while the series of validation and assessments of the payor terminal device and the payee terminal device may be performed by one or more other network devices.

Service provider devices 107-108 may include virtually any network computing device that is configured to provide, to fraud detection device 106, information including device addresses of the terminal devices, authentication file data, and other data related to the payor, payee, or the authentication file, etc. In some embodiments, the service provider devices 107-108 may provide various interfaces including, but not limited to, those described in more detail below in conjunction with FIG. 2.

Figure 2:
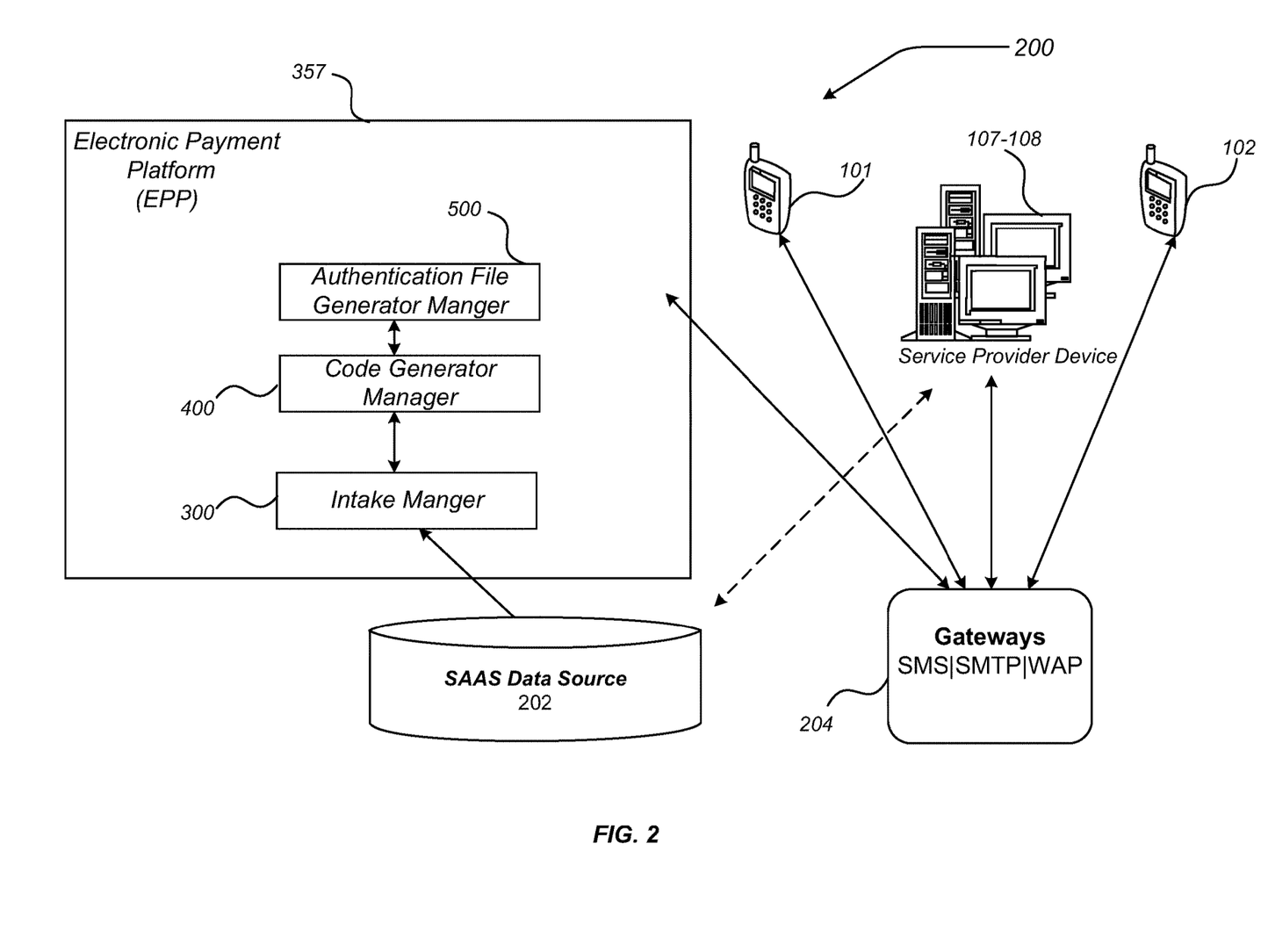
FIG. 2 shows one example of an electronic payment architecture that may be useable to facilitate electronic payment, in which certain examples of the disclosed principles may be implemented.

FIG. 2 shows one example of an electronic payment architecture 200 that may be useable to facilitate electronic payment in accordance with the disclosed principles. The electronic payment architecture 200 of FIG. 2 may include many more components than those shown. The components shown, however, are sufficient to disclose an illustrative embodiment for practicing the disclosed principles. The electronic payment architecture 200 may be deployed across the components of FIG. 1, including, for example, the fraud detection device 106, the payor terminal device 101, the payee terminal device 102, and/or the service provider devices 107-108.

The electronic payment architecture 200 includes an electronic payment platform 357 and a data source 202. The electronic payment platform 357 includes an intake manager 300, an on-board code generator 400, and an authentication file generator 500.

In the illustrated example, the electronic payment architecture 200 further includes communication channel or gateways 204, the payor terminal device 101, and the payee terminal device 102. Not all the components shown in FIG. 2, however, may be required to practice the examples disclosed herein and variations in the arrangement and type of the components may be made without departing from the spirit or scope of the present disclosure.

The data source 202 may be implemented within one or more service provider devices 107-108 of FIG. 1. The data source 202 may be configured to store such identification information related to the payor, the payee, the payor terminal device, the payee terminal device, etc. Furthermore, the data source 202 may include contextual information related to the authentication file.

Gateways 204 may include one or more components that are configured to enable network devices to deliver and receive interactive communications with one or more users. In one embodiment, gateways 204 may be implemented within one or more of service provider devices 107-108, the payor terminal device 101, and the payee terminal device 102 and/or within networks 111 of FIG. 1.

The electronic payment platform 357 is configured to receive a request to transfer the authentication file to the payee terminal device 102. The request may be received from the payor terminal device 101, or the payee terminal device 102. Alternatively, the request may be received at a third terminal device, not associated with the payor or the payee. The request to transfer the authentication file may include identification data of the payee/payee terminal device 102 from the data source 202. The electronic payment platform 357 may then implement intake manager 300 to parse and/or store the incoming data. In the event the data source 202 does not include identification data of the payee/payee terminal device 102, the electronic payment platform 357 can access identification data of the payee/payee terminal device 102 from the payor terminal device 101.

The on-board code generator 400 is configured to generate a unique on-boarding code associated with the payee terminal device 102. The electronic payment platform 357 is operable to send an on-board code generator to the payor terminal device 101 to implement when submitting the request to transfer the authentication file to the payee terminal device 102. In some examples, the on-board code may be sent to the payee terminal device 102 as an electronic file. Alternatively, the on-board code may be sent to the payee at the payee terminal device 102 by physical mail or electronic mail.

In some examples, the electronic payment platform 357 is operable to receive the on-boarding code and authentication file information for the payee terminal device 102 from the payor terminal device 101. The authentication file information includes an electronic payment address of the payee terminal device associated with the payee, and the destination for electronic payments. In some examples, the electronic payment address is a physical address of the payee, the IP address associated with the payee terminal device 102, or an electronic mail address. The electronic payment address is verified by the electronic payment platform 357. The verified electronic payment address information associated with the payee/payee terminal device is saved in the data source 202. The data source 202 is operable to store contact and electronic payment address information of each payee to enable rapid verification and identification of electronic payment address information for all payees.

The electronic payment platform 357 is operable to send the authentication file to the payee terminal device 102 on behalf of the payor terminal device 101. In the event the payee terminal device 102 does not receive the authentication file, the electronic payment platform 357, operating on the fraud detection device 106 for example, is operable to determine if the payee terminal device 102 failed to receive the authentication file. In some examples, the payor terminal device 101 can send an indicator to the electronic payment platform 357 indicating that the payee terminal device 102 never received the authentication file. Alternatively, the payee terminal device 102 can send an indicator to the electronic payment platform 357 indicating that the payee terminal device 102 never received the authentication file. The electronic payment platform 357 verifies that the payee terminal device 102 never received the authentication file.

It should be noted that the components shown in the electronic payment platform 357 of FIG. 2 are configured to execute as multiple asynchronous and independent processes, coordinated through an interchange of data at various points within the process. As such, it should be understood that managers 300, 400 and 500 may operate within separate network devices, such as multiple network devices, within the same network device within separate CPUs, within a cluster computing architecture, a master/slave architecture, or the like. In at least one embodiment, the selected computing architecture may be specially configured to optimize a performance of the manager executing within it. Moreover, it should be noted that while managers 300, 400 and 500 are described as processes, one or more of the sub-processes within any of the managers 300, 400 and 500 may be fully implemented within hardware, or executed within an application-specific integrated circuit (ASIC), that is, an integrated circuit that is customized for a particular task.

Figure 3:
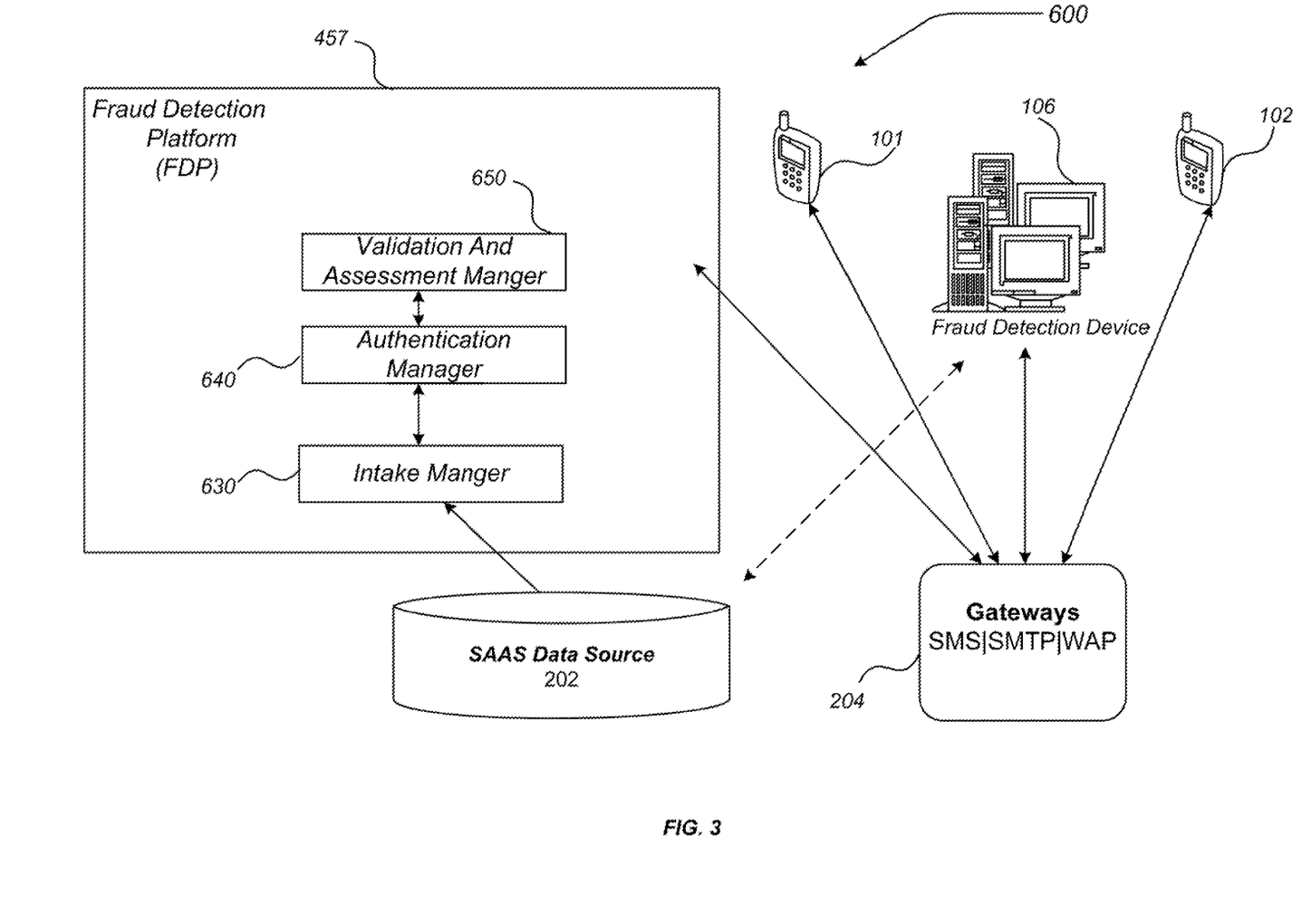
FIG. 3 shows one example of a fraud detection architecture that may be useable to detect payment interception and initiate payment mitigation, in which certain examples of the disclosed principles may be implemented.

FIG. 3 shows one example of a fraud detection architecture 600 that may be useable to detect payment interception and initiate payment mitigation in accordance with the disclosed principles. The fraud detection architecture 600 of FIG. 3 may include many more components than those shown. The components shown, however, are sufficient to disclose an illustrative embodiment for practicing the disclosed principles. The fraud detection architecture 600 may be deployed across the components of FIG. 1, including, for example, the fraud detection device 106, the payor terminal device 101, the payee terminal device 102, and/or the service provider devices 107-108.

The fraud detection architecture 600 includes a fraud detection platform 457 and the data source 202. The fraud detection platform 457 includes an intake manager 630, an authenticator manager 640, and a validation and assessment manager 650.

In the illustrated example, the fraud detection architecture 600 further includes the communication channel or gateways 204, the payor terminal device 101, and the payee terminal device 102. Not all the components shown in FIG. 2, however, may be required to practice the examples disclosed herein and variations in the arrangement and type of the components may be made without departing from the spirit or scope of the present disclosure.

The authenticator manager 640 of the fraud detection platform 457 is operable to verify the payee terminal device 102 is the intended recipient of the authentication file. The authenticator manager 640 accesses identification data of the payee/payee terminal device 102 from the data source 202 to determine the electronic payment address of the payee. The authenticator manager 640 is operable to compare the stored electronic payment address of the payee stored in the data source 202 to the present address of the payee terminal device 102. In the event the stored electronic payment address of the payee stored in the data source 202 is identical to the present address of the payee terminal device 102 the payee terminal device 102 is verified as the intended recipient of the authentication file. Alternatively, the authenticator manager 640 is configured to verify the payee terminal device 102 as the intended recipient of the authentication file based on the authentication file information.

Upon verifying the payee terminal device 102, the validation and assessment manager 650 of the fraud detection platform 457 performs a series of validations and assessments of the payor terminal device 101 and the payee terminal device 102. For example, the validation and assessment manager 650 reviews the initial transfer of an authentication file and any associated metadata to verify the payee terminal device 102 is the intended recipient of the authentication file. The validation and assessment manager 650 receives traverse data associated with the transfer of the authentication file. For example, the validation and assessment manager 650 is operable to determine the destination and any intermediate destinations of the authentication file once it leaves the electronic payment platform 357 of FIG. 2.

In some examples, the validation and assessment manager 650 is operable to validate and assess user credentials and the authentication file associated with the payee terminal device 102 via several methods. For example, the validation and assessment manager 650 is operable to validate and assess user credentials and the authentication file by monitoring a social media account of the payee, monitoring a financial account of the payee, monitoring a credit report associated with the payee, and monitoring a dark web interface of data related to the payee. In other examples, the payee terminal device 102 can be scanned for malware and other changes to its programming. Such changes in programming may include, for example, jailbreaking and other modifications of the payee terminal device 102, or risks associated with vulnerable domains.

In some examples, the validation and assessment manager 650 is operable to validate and assess user credentials based on multi-factor authentication. For example, the validation and assessment manager 650 is operable to obtain a set of user credentials from the payor terminal device 101. The set of user credentials from the payor terminal device 101 can include, for example, a user identity of the payor. The validation and assessment manager 650 is operable to access a data base (e.g., data source 202) containing a set of reference user credentials and verify the payor identity by comparing the set of user credentials with the set of reference user credentials.

The validation and assessment manager 650 determines a mobile device associated with the user identity, generates a secret indicia, transmits the secret indicia to the payor terminal device 101 and transmit an authentication request to the mobile device. The validation and assessment manager 650 is further operable to obtain an authentication response from the mobile device. Upon obtaining the authentication response, the validation and assessment manager 650 is operable to verify the user-supplied secret matches the secret indicia.

The fraud detection platform 457 is also operable to scan and assess the payee terminal device 102. The fraud detection platform 457 is able to determine if the payee's personal information and/or the payee terminal device 102 has been compromised by data breaches. The fraud detection platform 457, or a third party computing device on behalf of the fraud detection platform 457, analyzes public database dumps and associated leaked account information, and notifies the payee and/or payee terminal device 102 if the electronic payment address has been compromised. Moreover, the fraud detection platform 457, or a third-party computing device on behalf of the fraud detection platform 457, is operable to detect any authentication file interception from the electronic payment platform 357 of FIG. 2 to the intended destination of the payee terminal device 102.

The fraud detection platform 457 generates and delivers a second authentication file associated with the specified currency amount of the first authentication file to the payee terminal device 102, upon detection of the authentication file interception. In some examples, the fraud detection platform 457 is operable to facilitate the payee terminal device's 102 recovery of losses arising from the authentication file interception. For example, the payee assigns the payee's claims against a banking/financial institution to the fraud detection platform 457.

In some examples, the fraud detection platform 457 generates and delivers a second authentication file associated with the specified currency amount of the first authentication file to the payee terminal device 102 where the authentication file interception is determined to be a designated loss. For example, the second authentication file can include the specified currency amount of the first authentication file and any bank/financial institution/retailer fees arising from the authentication file interception. The fraud detection platform 457 is operable to receive the specified currency amount of the first authentication file and any bank/financial institution/retailer fees arising from the authentication file interception from the banking/financial institution.

The fraud detection platform 457 is operable to determine if an identity restoration (IDR) recovery process should be initiated for the payee associated with the payee terminal device 102. If initiated, the fraud detection platform 457 receives information regarding the payee, payee terminal device 102, and/or any associated credentials to provide additional mitigation of risk beyond the authentication file interception from the electronic payment platform 357 to the intended destination of the payee terminal device 102. Such additional mitigation might include, for example, monitoring financial accounts associated with the payee associated with the payee terminal device 102. The fraud detection platform 457 may receive a request to perform an action on behalf of the payee associated with the payee terminal device 102, such as, for example, initiate a credit report freeze of the payee.

Figure 4:
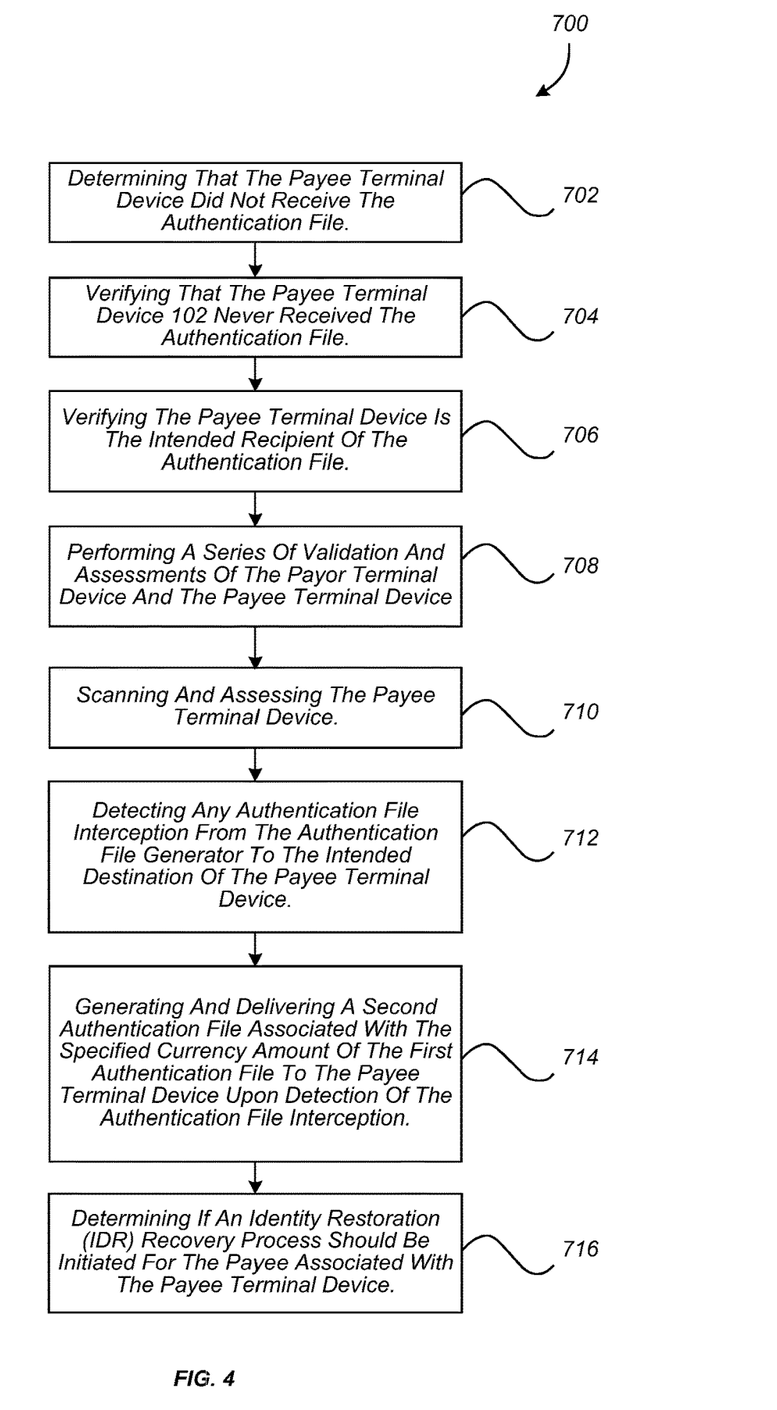
FIG. 4 shows one example of a process flow operable to detect payment interception and initiate payment mitigation, in which certain examples of the disclosed principles may be implemented.

FIG. 4 shows one example of a process 700 flow operable to detect payment interception and initiate payment mitigation, in which certain examples of the disclosed principles may be implemented. Process 700 may begin at block 702, where a determination is made that the payee terminal device 102 does not receive the authentication file. At block 704, the fraud detection platform 457 verifies that the payee terminal device 102 never received the authentication file.

At step 706, the fraud detection platform 457 is operable to verify the payee terminal device 102 is the intended recipient of the authentication file based at least in part on the stored electronic payment address of the payee stored in the data source 202. Alternatively, the fraud detection platform 457 is configured to verify the payee terminal device 102 as the intended recipient of the authentication file based on the authentication file information.

Upon verifying the payee terminal device 102 at block 706 of the process 700, the process 700 advances to block 708 where the fraud detection platform 457 performs a series of validation and assessments of the payor terminal device 101 and the payee terminal device 102.

At step 710, the fraud detection platform 457 is also operable to scan and assess the payee terminal device 102. For example, the fraud detection platform 457 is able to determine if the payee's personal information and/or the payee terminal device 102 has been compromised by data breaches. At step 712, the fraud detection platform 457, or a third party computing device on behalf of the fraud detection platform 457, is operable to detect any authentication file interception from the authentication file generator 500 to the intended destination of the payee terminal device 102.

At step 714, the fraud detection platform 457 generates and delivers a second authentication file associated with the specified currency amount of the first authentication file to the payee terminal device 102 upon detection of the authentication file interception. Optionally, at block 716, the fraud detection platform 457 is operable to determine if an identity restoration (IDR) recovery process should be initiated for the payee associated with the payee terminal device 102.

It will be understood that each block of the processes, and combinations of blocks in the processes discussed above, can be implemented by computer program instructions. These program instructions may be provided to a processor to produce a machine, such that the instructions, which execute on the processor, create means for implementing the actions specified in the block or blocks. The computer program instructions may be executed by a processor to cause a series of operational steps to be performed by the processor to produce a computer-implemented process such that the instructions, which execute on the processor to provide steps for implementing the actions specified in the block or blocks. The computer program instructions may also cause at least some of the operational steps shown in the blocks to be performed in parallel. Moreover, some of the steps may also be performed across more than one processor, such as might arise in a multiprocessor computer system. In addition, one or more blocks or combinations of blocks in the illustration may also be performed concurrently with other blocks or combinations of blocks, or even in a different sequence than illustrated without departing from the scope or spirit of the subject innovation. Accordingly, blocks of the illustration support combinations of means for performing the specified actions, combinations of steps for performing the specified actions and program instruction means for performing the specified actions. It will also be understood that each block of the illustration, and combinations of blocks in the illustration, can be implemented by special purpose hardware-based systems, which perform the specified actions or steps, or combinations of special purpose hardware and computer instructions.

What is claimed is:

1. A computer-implemented method comprising:
   receiving, by one or more computing devices, an indication of an attempted transmission of a first authentication file to a first device from a second device, the first authentication file containing coding information and a numerical value, the indication of the attempted transmission of the first authentication file comprising authentication information sent from the second device to the one or more computing devices, the authentication information comprising current location information of the first device;
   accessing, based on the authentication information, a data store to determine reference location information for the first device and reference credential information for the second device;
   comparing, by the one or more computing devices, based on the indication of the attempted transmission of the first authentication file to the first device, the current location information for the first device to the reference location information for the first device;
   confirming, based on the current location information-for the first device mapping to the reference location information for the first device, that a user of the first device is an intended recipient of the first authentication file sent from the second device;
   retrieving, based on the confirmation that the user of the first device is the intended recipient of the first authentication file, credential information from the second device;
   confirming, based on comparing the credential information from the second device to the reference credential information for the second device, an identity of the second device;
   determining, based on the confirmed identity of the second device, that the coding information is absent from the first device;
   determining, based on the determining that the coding information is absent from the first device, that the first authentication file sent to the first device has been intercepted;
   generating, by the one or more computing devices, based on the determining that the first authentication file sent to the first device has been intercepted, a second authentication file containing the numerical value; and
   sending, by the one or more computing devices, based on the determining that the first authentication file sent to the first device has been intercepted, the second authentication file to the first device.

2. The computer-implemented method of claim 1, wherein at least one of the first authentication file or the second authentication file includes a culmination of blockchain data blocks that are linked using cryptography.

3. The computer-implemented method of claim 1, wherein the current location information is identified from at least one of: an Internet Protocol (IP) address received from the first device, an electronic message associated with the first device, or an indication of a physical address for the first device.

4. The computer-implemented method of claim 1, wherein the determining that the coding information is absent from the first device is based on analysis of traverse data associated with transfer of the first authentication file, the traverse data received by the one or more computing devices.

5. The computer-implemented method of claim 1, further comprising verifying, based on user credentials received from the first device, an identity of the user of the first device.

6. The computer-implemented method of claim 1, further comprising initiating, based on the sending the second authentication file to the first device, an identity restoration (IDR) recovery process for the user of the first device.

7. The computer-implemented method of claim 1, further comprising sending, based on the determining that the first authentication file sent to the first device has been intercepted, a notification to the first device that the first device is compromised.

8. A system comprising:
   a memory; and
   at least one processor coupled to the memory and configured to perform operations comprising:
      receiving an indication of an attempted transmission of a first authentication file to a first device from a second device, the first authentication file containing coding information and a numerical value, the indication of the attempted transmission of the first authentication file comprising authentication information sent from the second device to the at least one processor, the authentication information comprising a present address of the first device;
      accessing, based on the authentication information, a data store to determine reference location information for the first device and reference credential information for the second device;
      comparing, based on the indication of the attempted transmission of the first authentication file to the first device, current location information for the first device to the reference location information for the first device;
      confirming, based on the current location information for the first device mapping to the reference location information for the first device, that a user of the first device is an intended recipient of the first authentication file sent from the second device;
      retrieving, based on the confirmation that of the first device is the intended recipient of the first authentication file, credential information from the second device;
      confirming, based on comparing the credential information from the second device to the reference credential information for the second device, an identity of the second device;
      determining, based on the confirmed identity of the second device, that the coding information is absent from the first device;
      determining, based on the determining that the coding information is absent from the first device, that the first authentication file sent to the first device has been intercepted;
      generating, based on the determining that the first authentication file sent to the first device has been intercepted, a second authentication file containing the numerical value; and
      sending, based on the determining that the first authentication file sent to the first device has been intercepted, the second authentication file to the first device.

9. The system of claim 8, wherein at least one of the first authentication file or the second authentication file includes a culmination of blockchain data blocks that are linked using cryptography.

10. The system of claim 8, wherein the current location informatin is identified from at least one of: an Internet Protocol (IP) address received from the first device, an electronic message associated with the first device, or an indication of a physical address for the first device.

11. The system of claim 8, wherein the determining that the coding information is absent from the first device is based on analysis of traverse data associated with transfer of the first authentication file, the traverse data received by the at least one processor.

12. The system of claim 8, the operations further comprising verifying, based on user credentials received from the first device, an identity of the user of the first device.

13. The system of claim 8, the operations further comprising initiating, based on the sending the second authentication file to the first device, an identity restoration (IDR) recovery process for the user of the first device.

14. The system of claim 8, the operations further comprising sending, based on the determining that the first authentication file sent to the first device has been intercepted, a notification to the first device that the first device is compromised.

15. A non-transitory computer-readable medium having instructions stored thereon that, when executed by at least one computing device, causes the at least one computing device to perform operations comprising:
    receiving an indication of an attempted transmission of a first authentication file to a first device from a second device, the first authentication file containing a numerical value, the indication of the attempted transmission of the first authentication file comprising authentication information sent from the second device to the at least one computing device, the authentication information comprising a present address of the first device;
    accessing, based on the authentication information, a data store to determine reference location information for the first device and reference credential information for the second device;
    comparing, based on the indication of the attempted transmission of the first authentication file to the first device, current location information for the first device to the reference location information for the first device;
    confirming, based on the current location information for the first device being identical to the reference location information for the first device, that a user of the first device is an intended recipient of the first authentication file sent from the second device;
    retrieving, based on the confirmation that the user of the first device is the intended recipient of the first authentication file, credential information from the second device;
    confirming, based on comparing the credential information from the second device to the reference credential information for the second device, an identity of the second device;
    determining, based on the confirmed identity of the second device, that coding information is absent from the first device;
    determining, based on the determining that the coding information is absent from the first device, that the first authentication file sent to the first device has been intercepted;
    generating, based on the determining that the first authentication file sent to the first device has been intercepted, a second authentication file containing the numerical value; and
    sending, based on the determining that the first authentication file sent to the first device has been intercepted, the second authentication file to the first device.

16. The non-transitory computer-readable medium of claim 15, wherein the at least one of the first authentication file or the second authentication file includes a culmination of blockchain data blocks that are linked using cryptography.

17. The non-transitory computer-readable medium of claim 15, wherein the current location information is identified from at least one of: an Internet Protocol (IP) address received from the first device, an electronic message associated with the first device, or an indication of a physical address for the first device.

18. The non-transitory computer-readable medium of claim 15, wherein the determining that the coding information is absent from the first device is based on analysis of traverse data associated with transfer of the first authentication file, the traverse data received by the at least one computing device.

19. The non-transitory computer-readable medium of claim 15, the operations further comprising verifying, based on user credentials received from the first device, an identity of the user of the first device.

20. The non-transitory computer-readable medium of claim 15, the operations further comprising initiating, based on the sending the second authentication file to the first device, an identity restoration (IDR) recovery process for the user of the first device.

* * * * *